United States Patent [19]

Antol et al.

[11] Patent Number: 4,539,738
[45] Date of Patent: Sep. 10, 1985

[54] STRAP AND VANE POSITIONING FIXTURE FOR FUEL ROD GRID AND METHOD

[75] Inventors: Ronald F. Antol, North Huntingdon Township, Westmoreland County; Ralph W. Kalkbrenner, Irwin; Richard M. Kobuck, Delmont, all of Pa.

[73] Assignee: Westinghouse Electric Corp., Pittsburgh, Pa.

[21] Appl. No.: 414,197

[22] Filed: Sep. 1, 1982

[51] Int. Cl.³ ............................................. B23Q 3/00
[52] U.S. Cl. .................................... 29/467; 29/281.1; 29/281.5; 29/400 N; 29/464; 29/559; 29/723; 228/212; 228/49.1; 269/37; 269/54.5; 269/309
[58] Field of Search ..................... 29/160, 281.1, 281.4, 29/281.5, 400 N, 464, 467, 559, 723; 269/47, 54.5, 309, 37; 24/306; 428/100; 228/49 R, 212

[56] References Cited

U.S. PATENT DOCUMENTS

| | | | |
|---|---|---|---|
| 1,949,262 | 2/1934 | Stromelly | 269/54.5 |
| 2,489,888 | 11/1949 | Huber | 228/212 X |
| 3,236,924 | 2/1966 | McClarney et al. | 269/47 X |
| 3,468,024 | 9/1969 | Yonkers | 29/407 X |
| 3,471,903 | 10/1969 | Northrup et al. | 24/306 |
| 3,494,006 | 2/1970 | Brumlik | 24/306 X |
| 3,522,637 | 8/1970 | Brumlik | 24/306 X |
| 3,550,245 | 12/1970 | Davis | 29/559 |
| 3,658,316 | 4/1972 | Chretin | 269/309 |
| 3,796,121 | 3/1974 | Scott | 269/54.5 |
| 3,844,887 | 10/1974 | Georges et al. | 165/162 |
| 4,090,918 | 5/1978 | Masetti | 165/162 X |
| 4,101,752 | 7/1978 | Duncan | 269/47 X |
| 4,216,257 | 8/1980 | Schams et al. | 428/100 X |

FOREIGN PATENT DOCUMENTS

906651  9/1962  United Kingdom ............... 29/159.2

Primary Examiner—Charlie T. Moon
Assistant Examiner—Ronald S. Wallace
Attorney, Agent, or Firm—Douglas E. Erickson

[57] ABSTRACT

A strap and vane positioning fixture is provided for aligning simultaneously the segments of straps forming a fuel rod grid. The fixture comprises a plate having a plurality of rods extending from it, in rows and columns, positioned for entry into cells of a grid. The rods at the periphery of the plate comprise a first set and have at their upper ends a spade with a single blade, the remaining rods comprising a second set and having at their upper ends a spade with a pair of blades. A method comprising engaging vanes extending from certain straps to align segments of each strap between the slots thereof, and holding the straps in the aligned position.

10 Claims, 26 Drawing Figures

STRAP AND VANE POSITIONING FIXTURE FOR FUEL ROD GRID AND METHOD

CROSS-REFERENCE TO COPENDING APPLICATIONS

Attention is drawn to the following copending, commonly assigned applications, all/each filed on even date and incorporated specifically by reference into the instant specification:

(1) "FUEL GRID WITH SLEEVES WELDED IN NOTCHED GRID STRAPS" (Westinghouse Case No. 49,420), by R. Duncan, Ser. No. 414,232;

(2) "PULSED LASER MACHINING APPARATUS" (Westinghouse Case No. 49,422), by R. A. Miller and G. D. Bucher, Ser. No. 414,264;

(3) "APPARATUS AND METHOD FOR LASER MACHINING IN NON-REACTIVE ENVIRONMENT" (Westinghouse Case No. 49,720), by R. A. Miller and G. G. Lessman, Ser. No. 414,242;

(4) "GRID ASSEMBLY FIXTURE, RETENTION STRAP AND METHOD" (Westinghouse Case No. 49,722), by R. M. Kobuck and R. W. Kalkbrenner, Ser. No. 414,198;

(5) "LASER MACHINING SYSTEM" (Westinghouse Case No. 49,723), by D. L. Wolfe, J. W. Clements and J. S. Kerrey, Ser. No. 414,241;

(6) "MOVABLE MACHINING CHAMBER WITH ROTATABLE WORK PIECE FIXTURE" (Westinghouse Case No. 49,938), by R. F. Antol, R. Kalkbrenner and D. L. Wolfe, Ser. No. 414,263;

(7) "WORKPIECE GRIPPING AND MANIPULATING APPARATUS FOR LASER WELDING SYSTEMS AND THE LIKE" (Westinghouse Case No. 49,961), by R. Kalkbrenner and R. Kobuck, Ser. No. 414,262;

(8) "LASER LENS AND LIGHT ASSEMBLY" (Westinghouse Case No. 50,106), by R. Antol, R. Kalkbrenner and R. Kobuck, Ser. No. 414,205;

(9) "WELDING PLATES FOR A FUEL ROD GRID" (Westinghouse Case No. 50,107), by R. M. Kobuck, R. Miller, R. W. Kalkbrenner, J. Kerrey and R. Duncan, Ser. No. 414,265;

(10) "PLURAL COMPUTER CONTROL FOR SHARED LASER MACHINING" (Westinghouse Case No. 50,288), by J. W. Clements and W. D. Lanyi, Ser. No. 414,204;

(11) "GRID AND SLEEVES WELDING FIXTURE AND METHOD" (Westinghouse Case No. 50,528), by J. S. Kerrey and R. Duncan, Ser. No. 414,203;

(12) "CALIBRATION OF AUTOMATED LASER MACHINING APPARATUS" (Westinghouse Case No. 50,529) by J. W. Clements and J. R. Faulkner, Ser. No. 414,272; and (13) "RIGID SUPPORT FOR LASER MACHINING APPARATUS" (Westinghouse Case No. 50,530), by D. L. Wolfe, Ser. No. 414,191.

BACKGROUND OF THE INVENTION

Description of the Prior Art

This invention, in its preferred form, relates to apparatus and a related method useful in connection with the production of fuel rod grids, particularly for causing vanes which extend at an angle from some of the straps forming the grid to be deflected to enable them to enter holes in a welding plate and to align segments of the straps.

Nuclear fuel bundle assemblies include a matrix of nuclear fuel rods which are arrayed in rows and columns, and which are held in the desired configuration by a plurality of fuel rod grids. These grids are produced from "straps" which are linearly extending, generally rectangular elements, characterized by having slots extending from one edge approximately half way through the depth of the strap. The straps are assembled so that one strap is in mating relationship with the other strap. Thus, the slot of one strap engages the other strap at a portion thereof which is in alignment with the slot of that other strap, with the result that the grid is of the same depth as each of the straps which forms the grid. The resulting grid has a first set of straps which are substantially parallel to each other, and equally spaced, and a second set of straps which are substantially parallel to each other and equally spaced, the straps of one set being perpendicular to the straps of the other set. All of the aforesaid straps are designated as "inner straps", and they are placed in mating relationship to form a square grid of square cells, in the above noted rows and columns. In addition, there are provided outer straps, which are placed on the four sides of the grid.

The inner and outer straps, made of Inconel, were provided with vanes, which extended from them at a substantial angle, for the purpose of causing water passing through the cells to be given a swirling, turbulent motion. Once the inner and outer straps were assembled to form a grid, brazing material was supplied at juncture points, and the assembled grid, with the brazing material, was positioned in an oven, where brazing was effected and thereby the joining together of the straps to form a sturdy grid.

The above-described method was satisfactory, but it involved the utilization of straps of Inconel. It has been discovered that Inconel results in less efficient use of the nuclear fuel than is desirable, and so there has been developed fuel rod grid straps made of Zircaloy. This material has the advantage that it permits a more efficient use of the nuclear fuel. However, Zircaloy cannot be joined by brazing, since it cannot be exposed to the temperatures necessary for brazing. As a result, it was found necessary to go to a technique of welding the Zircaloy straps in which a laser beam is utilized. The use of a laser beam requires that the straps be held relatively precisely, that is, that the straps of each set be substantially parallel, with their edges straight, the straps of the other set being also so held, and the straps of the two sets being perpendicular. These requirements led to the development of so called "welding plates", one of which was positioned against the side of the grid having the vanes thereon.

Although theoretically each of the straps is planar, in fact, the straps are dislocated from the theoretical planar configuration. It is to be recalled that the straps are made of Zircaloy, and are stamped from a long strip of Zircaloy material. This stamping mode together with subsequent bending operations produces stresses in the material. These stresses, in some instances, have a tendency to cause the straps not to occupy a true planar configuration. In addition, the straps must be handled during processing, thereby encountering various disturbing forces which contribute to the non-planar configuration of them.

The non-planar configuration has been found to be most noticeable in connection with the mating of the grid with a welding plate, called the "vane side welding plate". The vane side welding plate has a plurality of access holes extending through it to permit a laser beam to pass through the holes, to weld the points of intersection of the grid. Because the laser beam and the holding and positioning apparatus for the assembled welding plate and grid must position the grid precisely, to permit welding by the laser beam, the locations of the points of intersection of the straps forming the grid must be precise. The welding plates are therefore provided for this purpose, and include the above-noted laser beam access holes, and two sets of parallel grooves, for receiving the edges of the straps. The straps, along one edge, are provided with vanes, and one set of the straps has slots extending from that edge approximately half way through the depth of the strap, to accommodate a strap of the other set of straps. The slots thereby divide the straps of the one set into segments, and the above-noted stresses, from stamping, handling, and annealing, etc., cause the segments to be non-coplanar. Thus, the straps of the noted set will possibly have the segments thereof out of alignment, at least in part. Further, the holes for the laser beams in the vane side welding plate are as large as possible, but the size of the holes is limited because the strength of the welding plate is diminished by the holes, and beyond a certain size of holes, the welding plate would have a strength which would be too low. Consequently, should the vanes, which extend at an angle to the plane of the strap, be at too great an angle, or otherwise not aligned with the holes, the result will be that the vane side welding plate will strike one or more of the vanes, and bend them, thus preventing the mating relationship which is required between the grid and the vane side welding plate.

SUMMARY OF THE INVENTION

It is an object of this invention to provide equipment useful in the manufacture of grids of Zircaloy.

It is a more specific object of this invention to provide a fixture for engaging and deflecting the noted grid strap vanes to position them for entry into welding plate holes and to position the grid strap for mating with welding plate grooves.

It is a still further object of the present invention to provide a fixture for use in the manufacture of fuel rod grids which will deflect all of the vanes of certain of the grid straps so that they do not interfere with the placement of a fixture on the grid and to align strap segments.

In accordance with these and other objects of the invention, there is disclosed a generally flat plate having adjustable abutments extending above it, so as to position the grid at a predetermined distance above the plate; in addition, there are a plurality of upstanding parallel rods arranged in columns and rows and positioned to enter cells of the grid, each of the rods having at its upper end a spade for engaging and deflecting a vane or vanes of the grid. There are two groups of rods, one group at the periphery provided with vanes having a single blade, and the other group comprising the remainder of the rods, and having a pair of oppositely extending blades, for engaging two of the vanes, and for deflecting vanes to thereby align strap segments.

BRIEF DESCRIPTION OF THE DRAWINGS

A detailed description of the preferred embodiment of this invention is hereafter made with specific reference being made to the drawings in which.

DESCRIPTION OF THE PREFERRED EMBODIMENTS

For convenience, the following description of the invention and the related method and apparatus has been divided into sections as follows:

(1) Fuel Bundle Assembly and Fuel Rod Grid
(2) Grid Assembly Fixture and Retention Strap
(3) Grid Assembly Method
(4) Application of Strap and Vane Positioning Fixture and Welding Plates to Grid
(5) Strap and Vane Positioning Fixture

(1) FUEL BUNDLE ASSEMBLY AND FUEL ROD GRID

Figure 1:
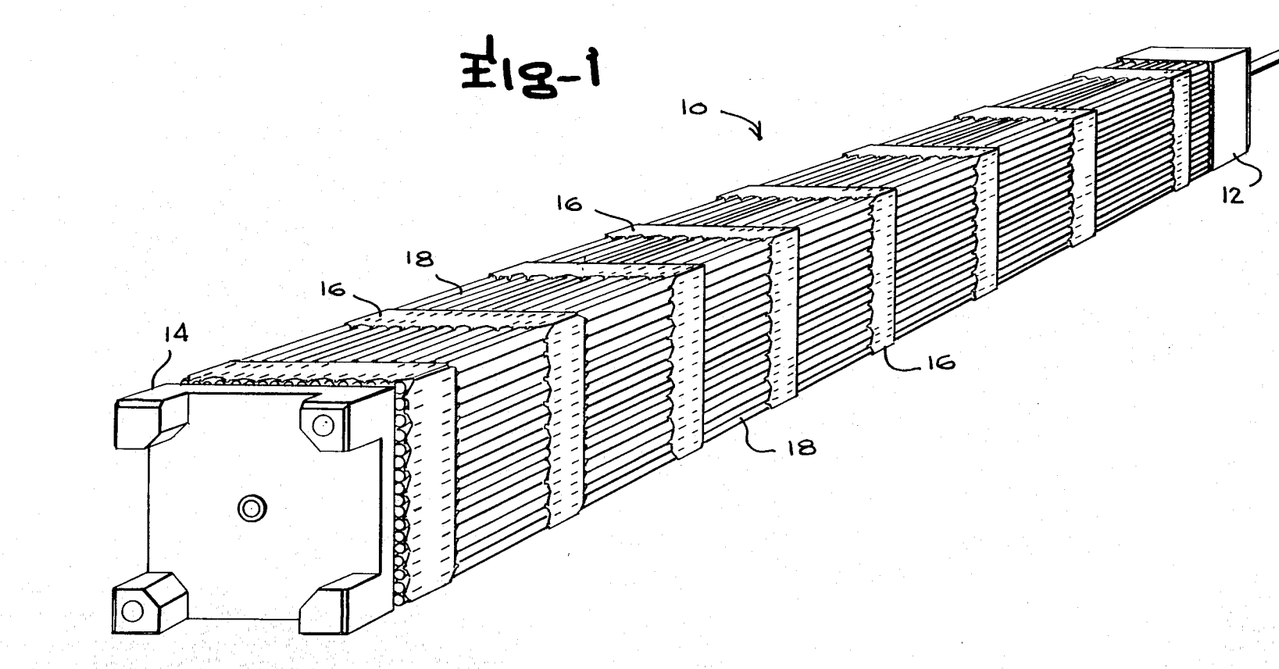
FIG. 1 is a perspective view of a nuclear fuel bundle assembly.

The apparatus and method of this invention is specifically designed as part of the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assembly 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and therefore, the orientation of the fuel rods 18 with respect to each other is rigorously controlled.

Figure 2A:
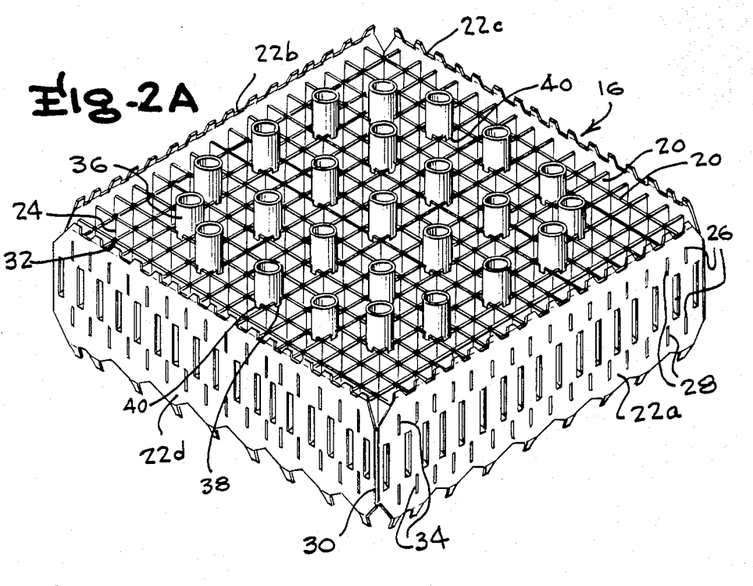
FIG. 2A is a perspective view of a completed grid.

The present invention is, in one illustrative embodiment thereof, related to the manufacture of fuel rod grids 16 as shown in FIG. 2A. The fuel rod grid 16 is of an approximately square configuration whose periphery is formed by four outer grid straps 22a, 22b, 22c, and 22d. Each end of an outer grid strap 22 is welded by a corner seam weld 30 to the end of a perpendicularly disposed outer grid strap. Two sets of spaced, parallel inner grid straps 20 are provided, the straps in the sets being perpendicular to each other, whereby a plurality of cells are formed to receive the control rods and the nuclear fuel rods 18. The inner grid straps 20 have mating slots therein providing points 24 of intersection. An intersect weld 32 is formed at each of the points 24 of intersection, whereby a rigid grid structure is formed. Further, each of the inner grids straps 20 includes at each end a pair of tabs 26 of a size and configuration to be tightly received in top and bottom slots 28 formed in the outer grid straps 22, as shown in FIG. 2A. A slot and tab weld 34 is effected along the top and bottom rows of slots 28 in the outer grid straps 22. Further, a plurality of guide sleeves 36 are disposed on the topmost surface of the fuel rod grid 16 to receive and guide the control rods disposed therein. A series of seam welds 38 securely attach the guide sleeves 36 to corresponding notches 40 formed within the inner grid straps 20. A precision laser welding apparatus is particularly adapted to perform a series of controlled welding operations whereby each of the welds 30, 32, 34, and 38 is carried out. The precision laser welding apparatus as described and claimed in Westinghouse Case 49723 and 49938 (U.S. patent application Ser. Nos. 414,241 and 414,263) not only controls the various parameters of generating the laser in terms of the pulse width and pulse height of each laser pulse and the number of pulses to be applied to each weld, but also controls the sequential positioning of the fuel rod grids 16 with respect to the laser beam. Between each such weld, the fuel rod grid 16 is repositioned and/or the focal point of the laser beam changed to effect the particular type of weld desired.

Figure 2B:
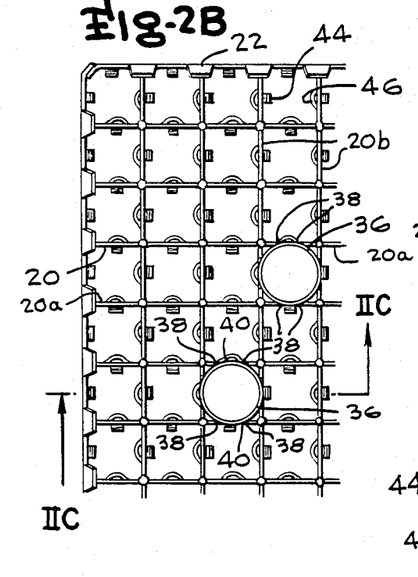
FIG. 2B is a plan view, showing a portion of the grid of FIG. 2A.
Figure 2C:
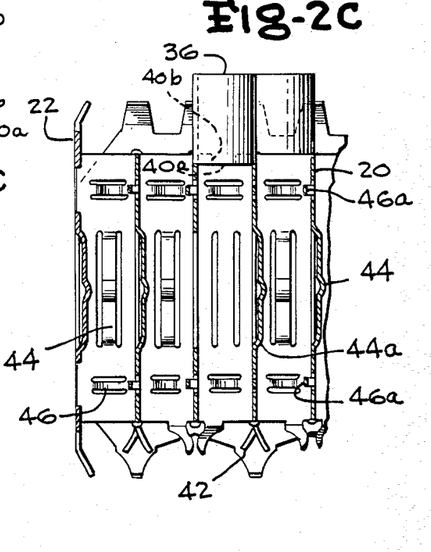
FIG. 2C is a cross-sectional view taken on the line 2C—2C of FIG. 2B.

FIG. 2B discloses a portion of the grid 16, showing two of the sleeves 36 joined to certain of the inner grid straps 20. FIG. 2C shows that there are provided in each of the cells formed by four intersecting straps resilient fingers 44 which have been stamped from the material of the straps, during the operation which has formed the straps from a continuous strip of metal. In addition, there are provided, at the bottom of the grid 16 as shown in FIG. 2C, vanes 42 which extend from the various straps 20 and 22, and lie at angles to the planes containing the straps from which they extend. Also provided are resilient spacing fingers 46.

Figure 2D:
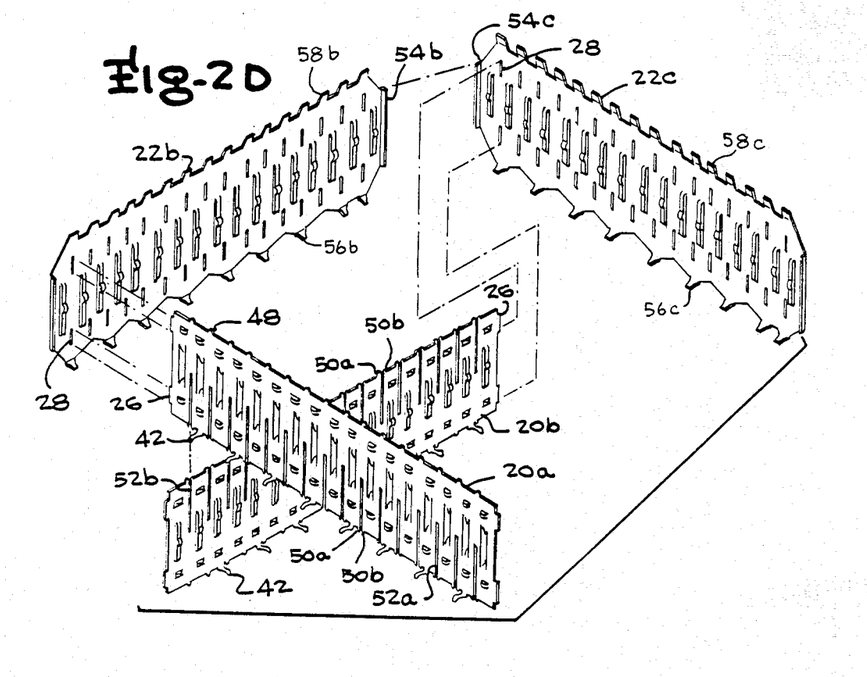
FIG. 2D is a perspective view showing inner and outer grid straps in disassembled relationship.
Figure 2E:
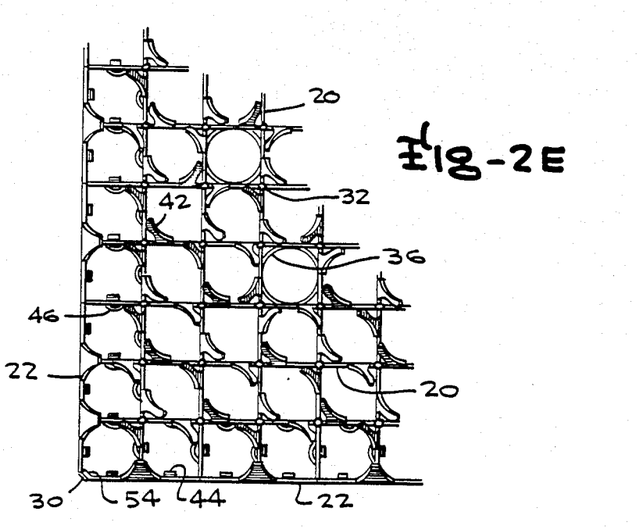
FIG. 2E is a plan view of a portion of a grid, taken from the unseen side of FIG. 2A.

In FIG. 2D, there is shown, in perspective, in exploded manner, outer grid straps 22b and 22c, and inner grid straps 20a and 20b. Inner grid strap 20a has projection tabs 48 along its upper edge and tab portions 50a and 50b at its lower edge, on either side of a bottom edge slot 52a. At the ends of the inner strap 20a, there may be seen the upper and lower tabs 26. On the inner grid strap 20b, mating slots 52b are provided at the upper edge, and it will be understood that in conventional fashion, the inner straps 20a and 20b are mated, extending perpendicularly to each other, at the mating slots 52a and 52b. The outer grid strap 22b and 22c are provided at their ends with corner tabs 54b and 54c. In FIG. 2E, these corner tabs 54 are shown in overlapped relationship, and are shown to extend at a 45° angle to the outer grid strap of which they form a part. The outer grid straps 22 have vanes 56 on their lower edges, and vanes 58 on their upper eges. As set forth above, each of the outer grid straps 22 is provided with upper and lower rows of slots 28 for receiving the tabs 26 of the inner straps 20. FIG. 2E discloses the cells formed by the two sets of parallel straps, the straps of one set mating with the straps of the other set and being perpendicular to them, and also discloses the vanes 42 which extend somewhat across the cells, so as to provide a turbulent flow of water passing through the cells.

(2) GRID ASSEMBLY FIXTURE AND RETENTION STRAP

Figure 3A:
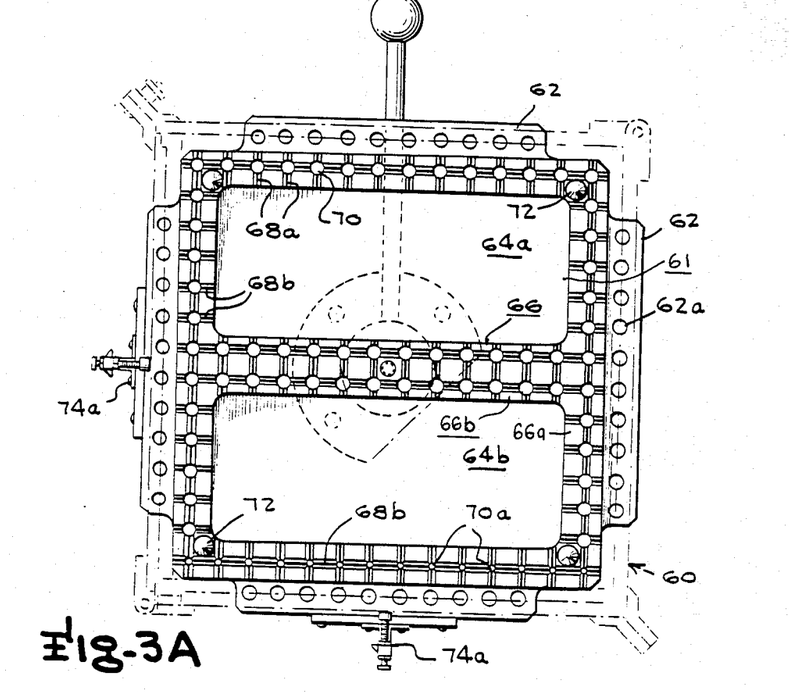
FIG. 3A is a plan view of a grid assembly fixture.
Figure 3B:
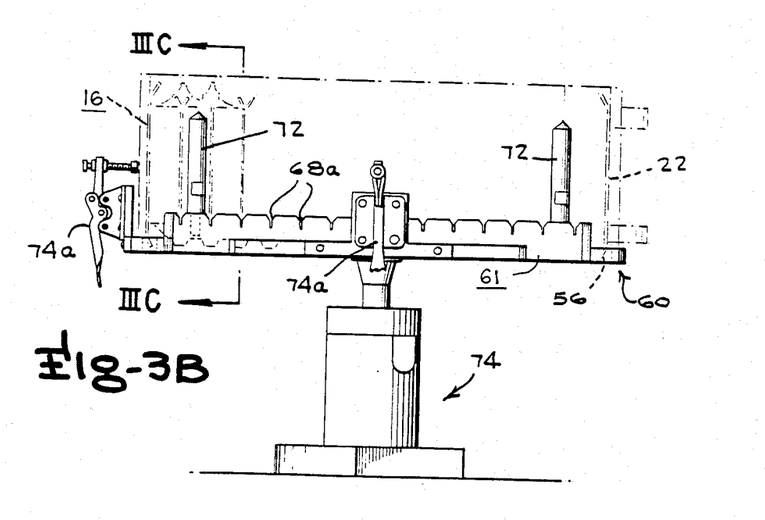
FIG. 3B is an elevational view of the grid assembly fixture, together with a support therefore.

In FIGS. 3A and 3B there is shown a grid assembly fixture 60 which includes a generally flat plate 61 of square plan form, and having extensions 62 at each side thereof. Each extension 62 is provided with a series of holes 62a extending therethrough. A pair of depressions 64a and 64b are provided in the upper surface of fixture 60, leaving a raised periphery 66a and a raised intermediate portion 66b. The raised portion 66 has a first set of spaced, parallel grooves 68a and a second set of spaced, parallel grooves 68b; these grooves are provided for receiving the inner grid straps 20. Where the grooves 68a intersect with the grooves 68b, bores 70 are provided; bores 70 are all the same size, except the bores 70a which are at the intersection of the lowermost groove 68b with the grooves 68a, as shown in FIG. 3A. The bores 70a are smaller than the bores 70 and serve as locating holes.

As shown in FIG. 3B, positioning pins 72 extend upwardly, adjacent each of the corners of the plate 61 of the grid assembly fixture 60. The grid assembly fixture 60 is mounted on a suitable support 74 by which it may be rotated on vertical and horizontal axes. The support 74 includes a pair of clamps 74a on adjacent sides of the plate 61 of fixture 60 for releasably holding the grid 16 on the fixture 60.

Figure 3C:
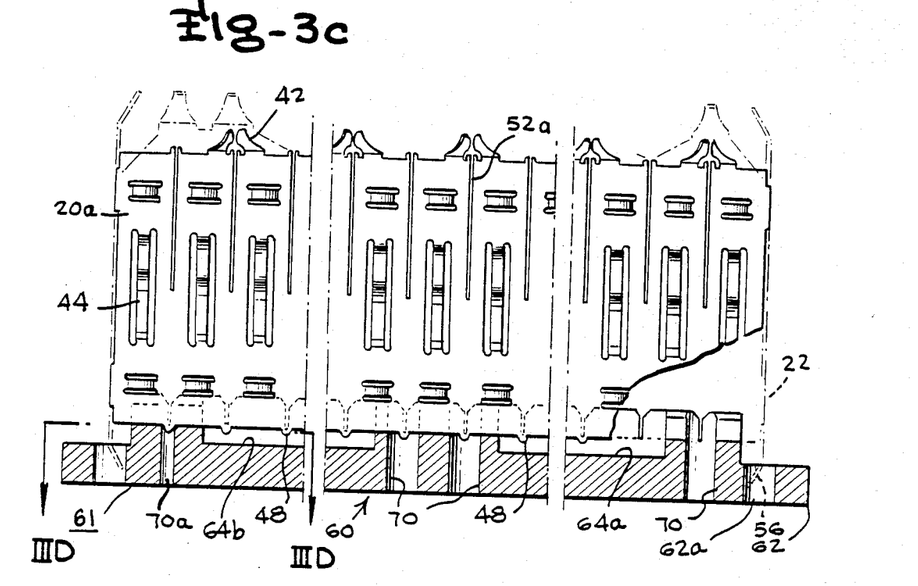
FIG. 3C is a cross-sectional view taken on the line of 3C—3C of FIG. 3B, and showing an inner grid strap in place.

FIG. 3C discloses an inner strap 20a having slots 52a extending from the upper edge thereof. In the fixture 60, there may be seen from the bores 70, which thereby receive the projecting tabs 48 extending from the bottom edge of the inner grid strap 20a. The bore 70a, which is noticeably smaller, receives the tab 48 which is adjacent the end of an inner strap 20a, to thereby serve as a locating hole, to facilitate the proper placement of each of the inner straps 20a in the fixture 60. This permits the bottom edge of inner grid strap 20a to rest at the bottom of the groove 68 in which it is positioned. As will be understood, the bottoms of the grooves 68a and 68b lie in a common plane, so that this common plane is that which is coincident with the plane formed by the bottom edges of the inner grid straps 20a and 20b. FIG. 3C also discloses that the recesses 64a and 64b receive a number of the projection tabs 48.

Figure 3D:
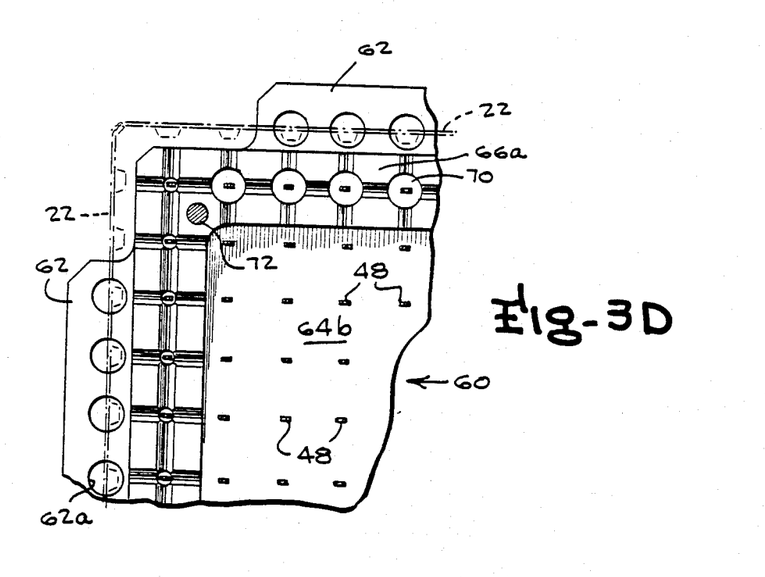
FIG. 3D is a cross-sectional view taken on the line of 3D—3D of FIG. 3C.

Referring now to FIG. 3D, there may be seen, in phantom lines, outer grid straps 22 resting on the extensions 62. The holes 62a receive the vanes 56 which extend from the bottom edges of the outer grid straps 22: see also FIGS. 3B and 3C.

Figure 4:
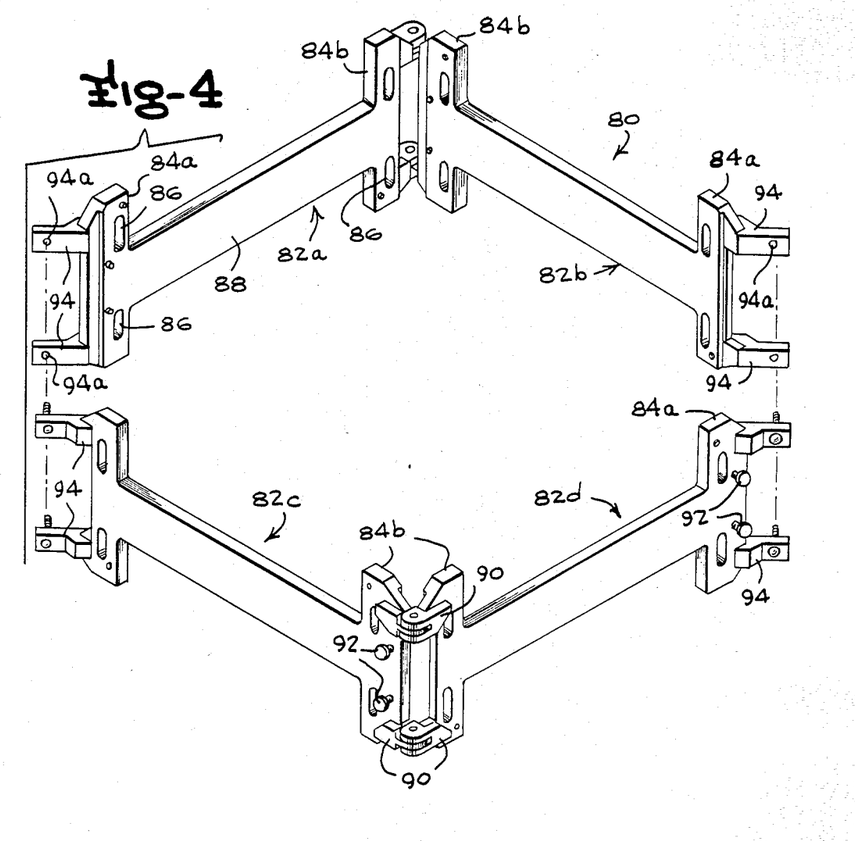
FIG. 4 is a perspective view of a retention strap in accordance with the present invention, in partially disassembled relationship.

In FIG. 4, there is shown a retention strap 80 which is comprised of four substantially identical bars 82a, 82b, 82c, and 82d. Referring to bar 82a, it will be seen to be of generally H-shape, including a pair of end posts 84a and 84b, each post 84 having upper and lower openings 86 therethrough. The posts 84a and 84b are connected by a cross member 88. The posts 84b of the bars 82a and 82b and the posts 84b of the bars 82c and 82d have hinge elements 90 extending from them, so as to hingedly connect the bars 82a and 82b together as a pair and to hingedly connect the bars 82c and 82d together as a pair. A substantial space is provided between the adjacent edges of the posts 84b, due to the extension of the hinge elements 90 therefrom.

At the post 84b of bar 82c and at the post 84a of bar 82d, screws 92 are provided, extending through the posts, and having threaded engagement in holes therein.

Figure 5A:
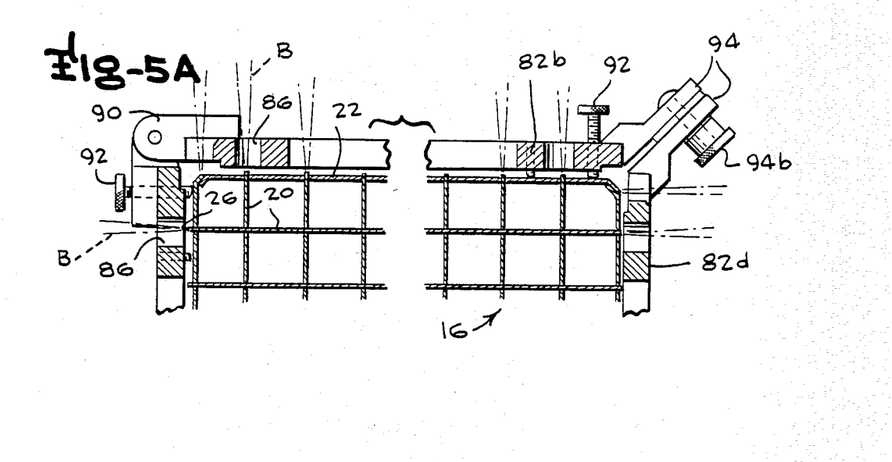
FIG. 5A is a plan view, partially in section, showing a part of the grid, and portions of the retention strap thereon.

Spaced upper and lower connecting pieces 94 extend from each of the posts 84a, at an angle of 45° to the plane of the bar of which it forms a part (see also FIG. 5A), these connecting pieces 94 having apertures 94a therein, for the reception of threaded fasteners 94b. As shown in FIG. 5A, the connecting pieces 94 and fasteners 94b serve to connect together the bars 82b and 82d, and it will be understood, that in similar fashion, the connecting pieces 94 and fasteners 94b will serve to connect together the bars 82a and 82c, thereby releasably connecting the two pairs of bars. As shown in FIG. 5A, the openings 86 are in alignment with projection tabs 26 (upper and lower) on the inner grid straps 20, and are above and below the cross member 88, thereby providing access for the laser beam B to effect the slot and tab welds 34.

Figure 5B:
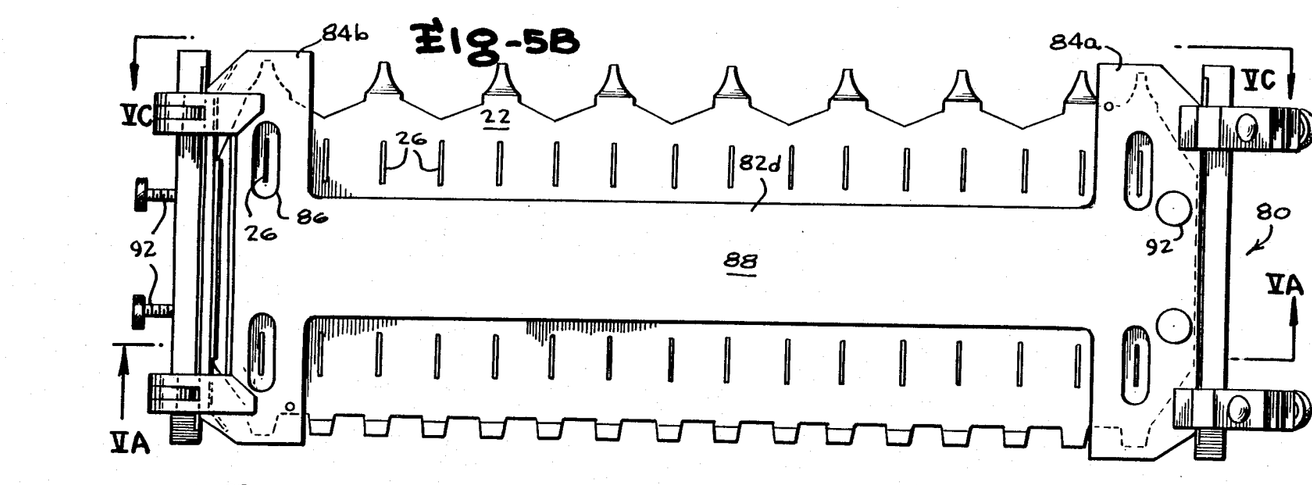
FIG. 5B is an elevational view of the grid with the retention strap thereon.
Figure 5C:
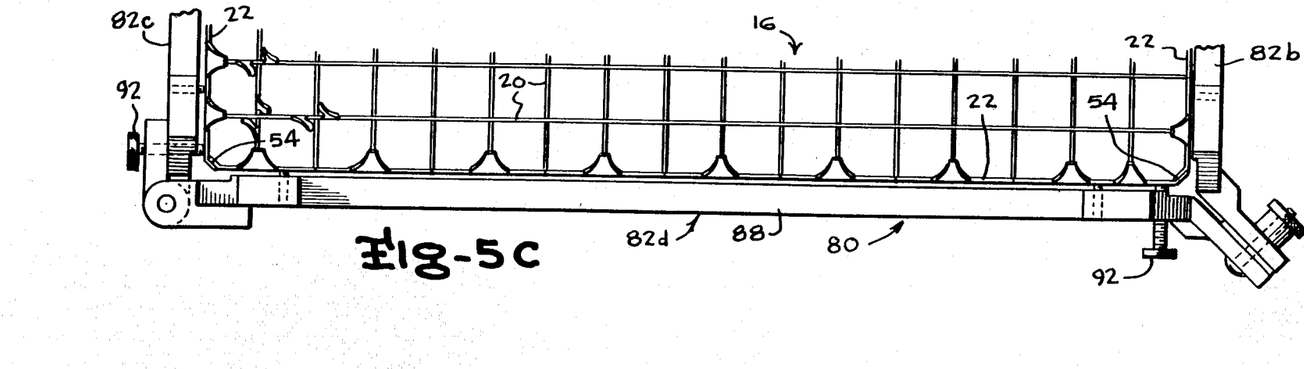
FIG. 5C is a view taken on the line 5C—5C of FIG. 5B.

In FIG. 5B, there is shown a side view of the structure of FIG. 5A, in which the grid 16 has been formed by the mating intersection of the inner grid straps 20 and by the application onto the tabs 26 thereof of the outer grid straps 22. Thus, the retention strap 80 extends about the periphery of the assembled grid 16, holding the inner and outer straps 20 and 22 in the noted assembled relationship. The screws 92 are used to provide some adjustment in the amount of clamping force applied by the retention strap 80. In FIG. 5B, there may be seen the bar 82d with the posts 84b and 84a, each with the openings 86 therethrough aligned with the tabs 26. The cross member 88 will be seen to lie between the upper and the lower tabs 26, thereby exposing them to the action of the laser beam for welding the slot and tab welds 34. In FIG. 5C, there is shown the grid 16 formed of the inner grid straps 20 and the outer grid straps 22, the bars 82d, 82b, and 82c of retention strap 80, as well as the screws 92 bearing against two perpendicularly related outer grid straps 22. Further, there may be seen in FIGS. 5B and 5C the space between the adjacent edges of the bars 82 forming the retention strap 80 which permits entry of the laser beam for effecting the corner seam weld 30 of the corner tabs 54. This is accomplished by the extended construction of the hinge elements 90 and of the connecting pieces 94, and their vertical separation to permit access to the corner tabs 54.

(3) GRID ASSEMBLY METHOD

Figures 6A, 6B, 6C, 6D:
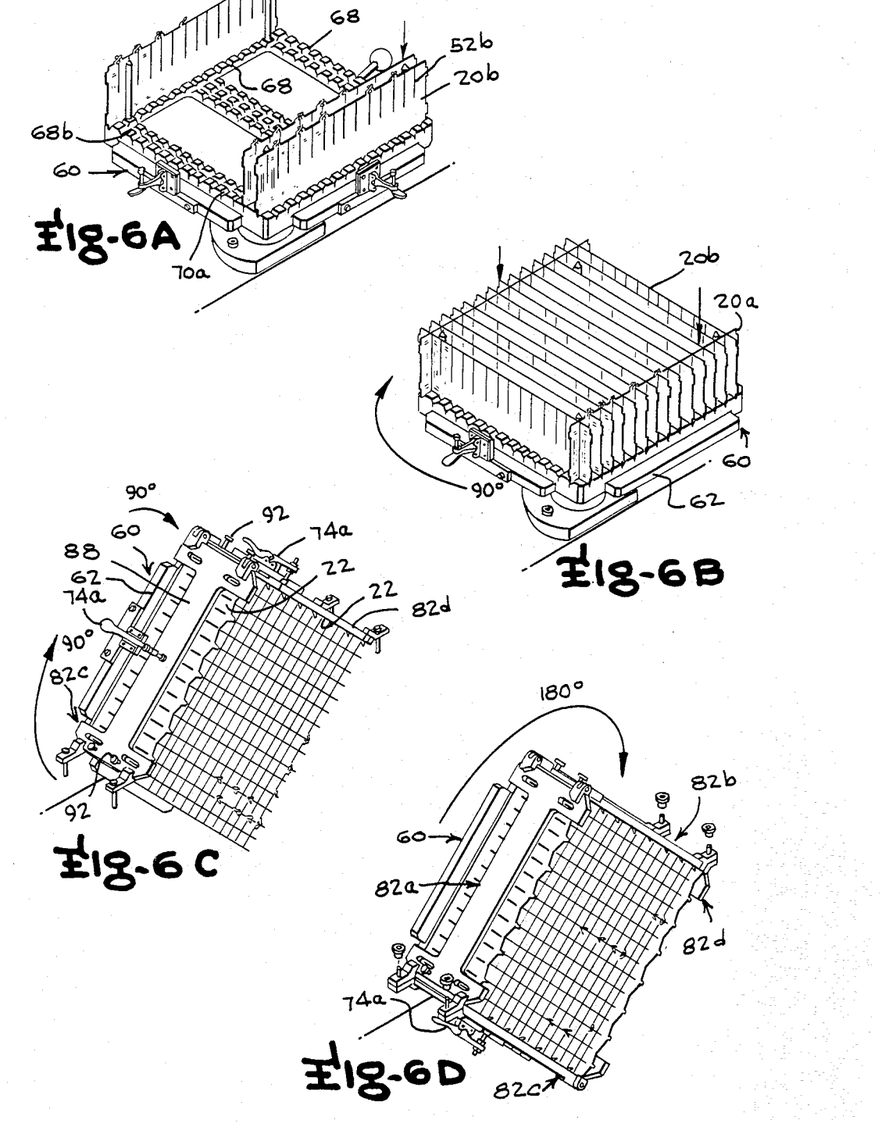
FIG. 6A is a perspective view showing a first step in accordance with the method of the present invention.
FIG. 6B is a perspective view showing a second step, in which the grids of the second set are being positioned.
FIG. 6C is a perspective view showing the placement of a first pair of bars of a retention strap on the grid, after rotation of the grid.
FIG. 6D is a perspective view, after rotation of the structure of FIG. 6C through substantially 180° and the placement of two additional bars of the retention strap on the grid.

Referring to FIG. 6A, there is disclosed the grid assembly fixture 60, placed in a horizontal plane, or slightly tilted, there being inserted into the grooves 68 thereof inner grid straps 20b, which are thereby held in spaced, parallel relationship and which form a first set of straps. The mating slots 52b thereof are in their upper edges and the endmost projection tabs 48 are in the bores 70a. The lower unslotted edges are in the grooves. After insertion of all of the inner grid straps 20b, the fixture 60 is rotated 90°, and, referring to FIG. 6B, the inner grid straps 20a comprising a second set of straps are inserted, the mating slots 52a in their lower edges cooperating with the mating slots 52b of the inner grid straps 20b so that each strap enters into slots of straps of the other set. The positioning of the straps 20a and 20b is achieved through the guidance provided by the grooves 68, and by the mating relationship of the inner grid straps 20a and 20b, as well as the bores 70a.

Next, utilizing the ability of the support 74 to permit movement of the fixture 60 about a horizontal axis, the fixture 60 is tilted, so that the plane of fixture 60 is inclined to the horizontal, and may, for convenience, be anywhere between 45° to the horizontal and vertical. This is the position shown in FIG. 6C, and in this position, two of the outer grid straps 22 are placed on the tabs 26 of the inner grid straps 20, being those tabs which are extending in an upward direction. The tabs 26 will be caused to enter the slots 28 in the outer grid straps 22, and after this is accomplished, a portion of the retention strap 80 is placed in position on the partially completed grid 16.

More particularly, a pair of hingedly connected bars 82c and 82d, having the screws 92 therein, are placed on the two outer grid straps 22. Some pressure may be applied to the outer grid straps 22 by actuation of the clamps 74a, and if any of the tabs 26 have not passed through the slots 28, the pressure from the clamps 74a will assist in accomplishing this goal, possibly with the aid of a known tool, designated a "picking tool". As will be seen, the clamps 74a bear against the cross members 88 of the bars 82 to apply the noted light pressure. Thus, the bars are held in position against the outer grid straps 22.

Referring to FIG. 6D, the assembly shown in FIG. 6C has been rotated through approximately 180°, so that the bars 82a and 82b are on the lower portions of the partially completed grid 16. The two remaining outer grid straps 22 are applied, as before, with entry of some or all of the tabs 26 into the slots 28. In practice, a sufficient number and distribution of the tabs 26 will be caused to enter the slots 28 to ensure that these outer straps 22 will be held in their approximate position.

In placing the outer grid straps 22 in position, it will be understood that they will be placed on the extensions 62 of fixture 60, in the manner disclosed in FIG. 3C.

After rotation of the fixture 60 and the inner straps 20, outer straps 22, and bars 82c and 82d into the position shown in FIG. 6D, and the application of the final two outer grid straps 22, the final two bars 82 are placed on the upwardly facing outer grid straps 22. Thus, there may be seen in FIG. 6D the bars 82a and 82b, and after proper alignment of the apertures 94a, the fasteners 94b are cast through them, so as to complete the assembly of the retention strap 80. If necessary, any tabs 26 not in slots 28 may be positioned therein, referably before the application of the final two bars 82. The assembly of the inner and outer straps 20 and 22 which form the grid 16 is thereby completed, and these straps are held in the appropriate position by the retention strap 80. The next step is to return the fixture 60 to the horizontal position, after which the clamps 74a may be released, and the assemblage of the inner grid straps 20, outer grid straps 22 and retention strap 80 may be lifted from the fixture 60 and is thereby available for further processing.

(4) APPLICATION OF STRAP AND VANE POSITIONING FIXTURE AND WELDING PLATES TO GRID

Figures 7A, 7B, 7C:
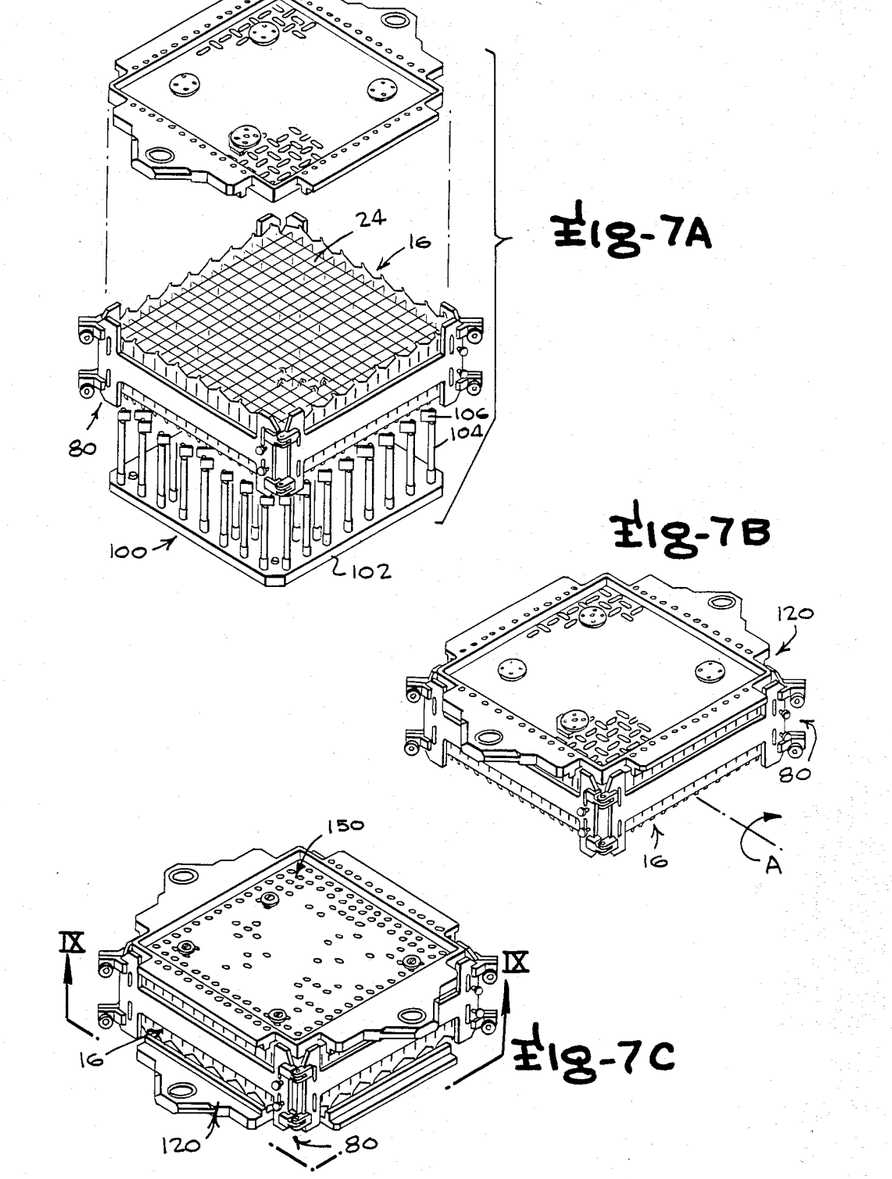
FIG. 7A is an exploded perspective view showing a grid with retention strap in place thereon, a strap and vane positioning fixture, and a vane side welding plate.
FIG. 7B is a perspective view showing the grid and retention strap, and the vane side welding plate in position on the grid.
FIG. 7C is a perspective view showing the grid and retention strap inverted from the position shown in FIG. 7B, with the vane side welding plate on the underside of the grid, and with a sleeve side welding plate in place on the grid.

There is shown in FIG. 7A a grid 16, having a retention strap 80 placed thereon, in position as a unit over a strap and vane positioning fixture 100 comprising a plate 102 and a number of upstanding elements, including rods 104 having spades 106 at their upper ends. The fixture 100, which will be described in more detail hereinbelow, functions to deflect vanes which extend at an angle from the straps which form the grid 16 and segments of straps from which the vanes extend. Also shown in FIG. 7A is a vane side welding plate 120, which is placed on the grid 16 after the vanes of the straps thereof have been deflected by the fixture 100, so as to position the vanes in alignment with the openings of the vane side welding plate 120 and to position the upper edges of the Zircaloy straps so that each of the straps is substantially coplanar. When the grid 16 is assembled, with the retention strap 80 thereon, some of the inner straps may have some deflection in them, so that their upper edges are not as straight as desirable, or for some other reason the grid 16 does not approach a theoretical grid, in which all of the straps of each set are precisely parallel to the other straps of the set, in which the straps of one set are precisely perpendicular to the straps of the other set, and in which each point of intersection 24 is precisely located in a rectangular grid pattern relative to each other point of intersection 24. The vane side welding plate 120 serves the function of causing the straps to be held more closely parallel, etc., so that the grid 16 may be welded, with accuracy and rapidity, by suitable welding apparatus, such as a laser welding apparatus. Such an apparatus is disclosed in Westinghouse Case No. 49,723 (U.S. patent application Ser. No. 414,241) entitled Laser Welding System.

In FIG. 7B, there is shown the next step in the processing of the grid 16, in which the vane side welding plate 120 has been positioned on and in engagement with the grid 16 to hold the straps in the more closely parallel position, as set forth above. The fixture 100 is then removed, thereby exposing the side of the grid 16 which is opposite the vane side, that is, which exposes the side of the grid 16 which is opposite to that shown in FIG. 7A. Thereafter, the grid 16, retention strap 80, and vane side welding plate 120 are inverted, as by being rotated in the direction indicated by the arrow A on FIG. 7B, to thereby bring the opposite side of grid 16 into the upper position, with the vane side welding plate 120 therebeneath. There is then placed on the opposite side of grid 16, which is designated as the sleeve side, a sleeve side welding fixture 150. With the assemblage as shown in FIG. 7C, the next step is the welding of the grid 16, as by laser beam welding. This includes, broadly, the welding of the points of intersection 24 on each side of the grid 16, as well as the welding of the corners of the grid 16, and the welding of tabs of the straps of the grid 16, where they extend into slots in outer straps of the grid 16.

(5) STRAP AND VANE POSITIONING FIXTURE

Figure 8A:
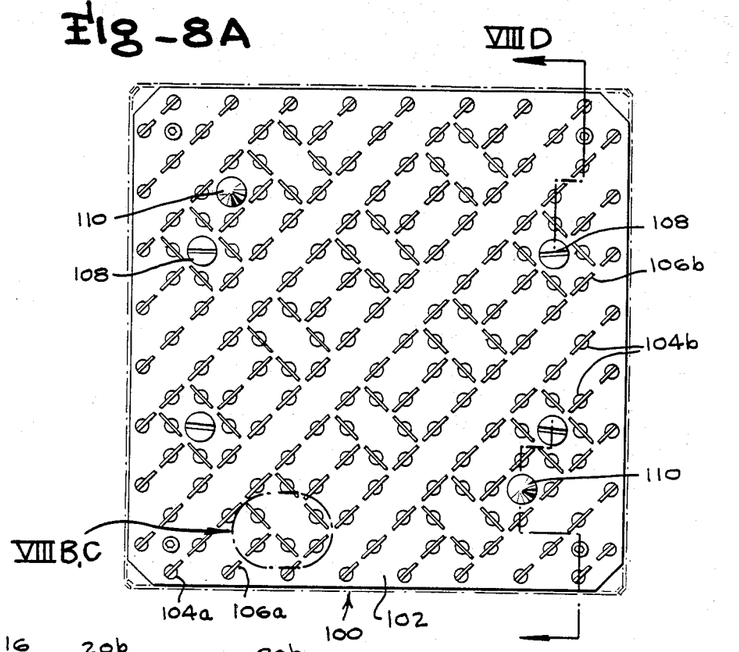
FIG. 8A is a plan view of the strap and vane positioning fixture.

Referring now to FIG. 8A, there is shown in plan view the fixture 100, there being seen the relatively flat and square plate 102, having rods 104a at the periphery thereof, each provided with a spade 106a having a single blade. The rods 104a constitute a first group of rods, the second group of rods being designated 104b, and constituting all of the interior rods. The interior rods 104b are provided with spades 106b, each having a pair of oppositely extending blades. There may also be seen in FIG. 8 adjustable abutment members 108, and guide pins 110.

Figure 8B:
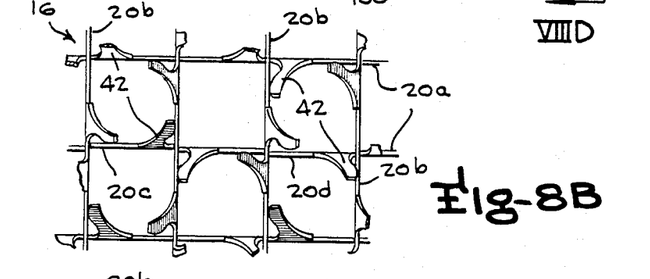
FIG. 8B is an enlarged view of a portion of a grid, showing the vanes.

FIG. 8B shows on an enlarged scale a portion of the grid 16, including the inner grid straps 20a and 20b, having vanes 42 extending from them. As will be seen, there is formed a "cell" by each two adjacent inner grid straps 20a and each two adjacent inner grid straps 20b.

Referring to FIG. 2D, the inner straps 20a and 20b are shown with the vanes 42 extending from the lower edges of straps 20a. Referring to the inner strap 20a, the slots 52a which extend from the same edge as the vanes 42, which is the lower edge in FIG. 2D, divides the lower half of the inner strap 20a into segments. The vanes 42 are provided on alternate ones of the segments of inner strap 20a, although it will be understood that not all inner straps 20a are identical in respect to the number and location of the vanes. Distinguished from the construction of inner strap 20a is inner strap 20b, in which the slots 52b extend from the edge of the strap opposite to the edge from which the vanes 42 extend. Due to stresses resulting from the stamping operations to which the strap 20a is subjected, to handling and storing operations, etc., it has been found that the segments do not remain in a theoretical plane of the inner strap 20a, but may bend, generally along a line parallel to the upper and lower edges of inner strap 20a and extending through the bottoms of the slots 52a. The segments are clearly shown in FIG. 3C, wherein the inner strap 20a is somewhat different from the inner strap 20a shown in FIG. 2D, in the number and positioning of the vanes 42. There may also be seen the segments defined by the slots 52a, each of which extends to a point approximately one-half way through the depth of the strap 20a, so that the lower ends of these slots lie along a common line; it is along that line that the segments between the slots 52a tend to be deflected or bent out of a theoretical planar alignment.

FIG. 8B shows a portion of the grid 16, with the straps 20a extending horizontally and the straps 20b extending vertically, the straps having vanes 42 extending from them and over the adjacent cells. It is the above-noted segments of inner straps 20a which are subject to being deflected or otherwise misaligned, as above set forth. In FIG. 8B, it will be seen that segment 20c of the middle inner strap 20a is deflected upwardly, and that segment 20d of the same inner strap 20a is deflected downwardly, as viewed in FIG. 8B.

Figure 8C:
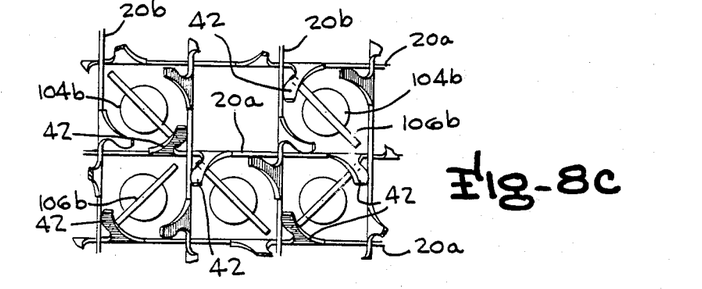
FIG. 8C is a view similar to 8B, but with spades of the strap and vane positioning fixture in place, engaging the vanes.

In FIG. 8C, there is shown the same structure as is set forth in FIG. 8B, but with the grid 16 placed over the fixture 100, so that rods 104 are caused to extend into various ones of the cells, and the spades 106 thereof of the type having two blades, as indicated in FIG. 8C, engage the vanes 42 of any segments which have been deflected, so as to restore them into alignment with other parts of the inner strap 20a. This will be seen from a comparison of the position of the vanes 42 of segments 20c and 20d in FIGS. 8B and 8C and of these illustrative segments. As will be understood, FIG. 8C only provides a disclosure of the rods 104b of the inner group of rods, that is, those having spades with two blades.

Figure 8D:
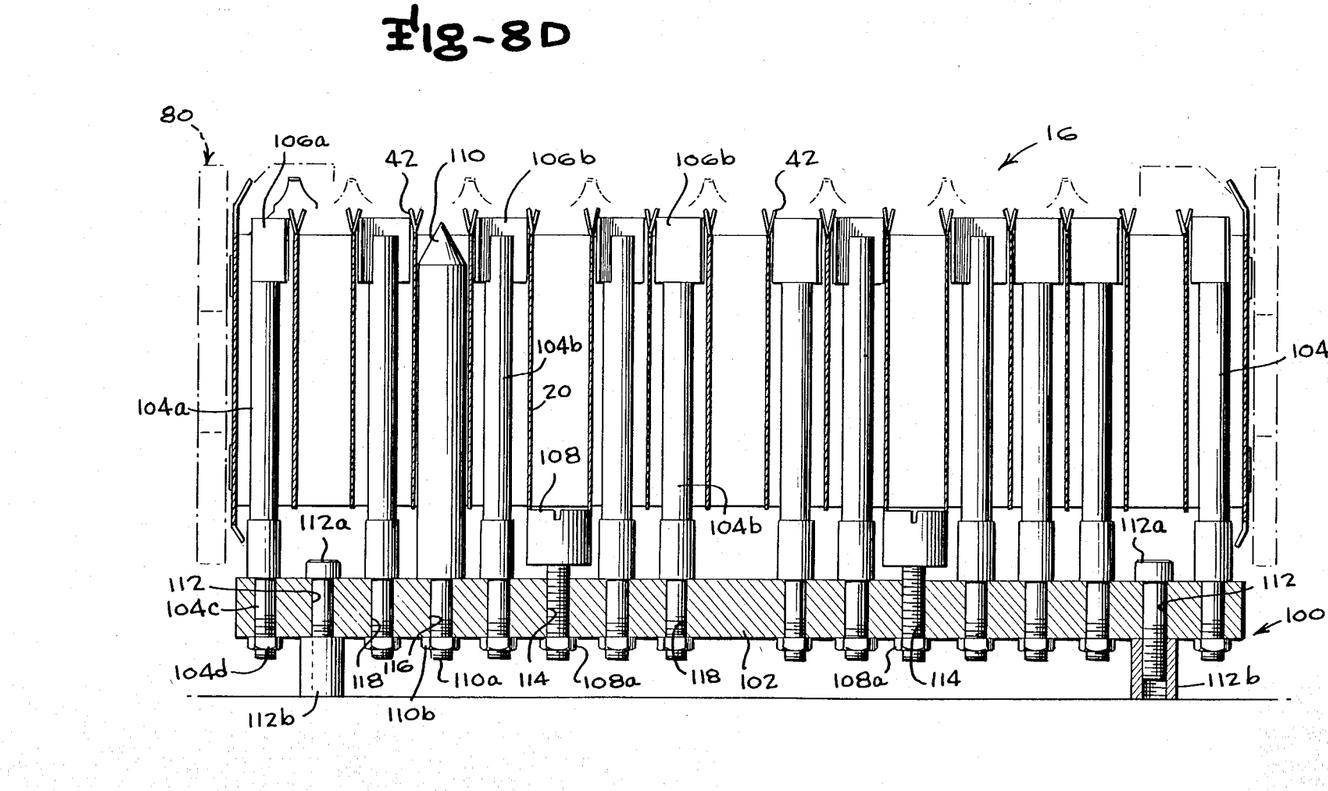
FIG. 8D is a cross-sectional view taken on the line 8D—8D of FIG. 8A.

In FIG. 8D there is shown the fixture 100, having the grid 16 in place thereon, and shown partly in section. Also shown, in phantom lines, is the retention strap 80.

The fixture 100 includes the substantially flat plate 102. A pair of bores 112 have bolts 112a extending through them, on which are threaded nuts 112b, which thereby form feet for supporting the fixture 100. The adjustable abutment members 108 are in the form of bolts which are threaded into bores 114, having nuts 108a thereon, so that, in known fashion, the members 108, through their slotted heads, may be moved axially, so as adjustably to position the upper surfaces thereof. It will be understood that it is the upper surfaces of the adjustable abutment members 108 which will engage with the side of the grid 16 which is opposite the vanes 42, and which is designated as the "sleeve side".

The guide pins 110, of which a single one is shown in FIG. 8D, have at their lower ends a threaded extension 110a which passes through a bore 116, a nut 110b being threaded onto the extension 110a to securely position the guide pin 110 and hold it rigidly to the plate 102.

Rods 104a and 104b are shown supported on the plate 102, having threaded extensions 104c passing through bores 118 in the plate 102, and being secured to plate 102 by the nuts 104d. The rods 104a, which are at the periphery of the plate 102, will be seen to have a spade 106a having a single blade, and the rods 104b which are not at the periphery will be seen to have spades 106b having two blades. Each of the spades 106a, 106b engages, respectively, one or two of the vanes 42, and deflects the segments to which the vane is attached and which segment is out of alignment. This causes all of the segments of each of the straps 20a to be aligned in a single plane, as shown in FIG. 8C and in FIG. 8D. The number and location of the rods 104a and 104b are chosen so that each of the vanes 42 which is attached to or extends from a segment which is out of alignment in a direction to cause the vane attached to it not to enter an access hole is engaged by and deflected by a spade 106a, 106b. In that way, each of such segments of the inner straps 20a of the grid 16 is deflected into a position in which it is in alignment and is coplanar with each of the other segments of the straps 20a.

In some instances, it may be desirable to engage all of the vanes 42 of the inner straps 20a and cause them to be slightly over-deflected, so that they are slightly beyond the actual theoretical coplanar orientation with the lower portions of the inner straps 20a of which they are a part. This provides a slight measure of safety, so that there will be assurance that all of the vanes 42 will enter the access openings provided in the vane side welding plate, as described below.

Figure 9:
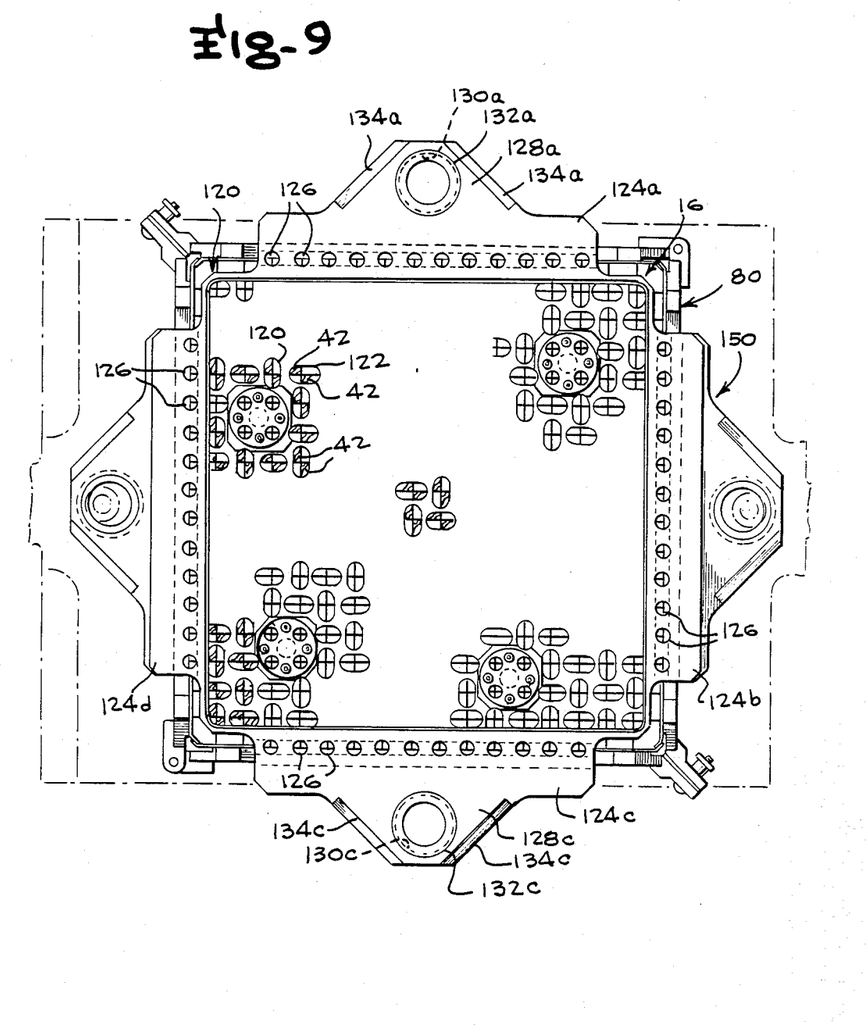
FIG. 9 is a plan view showing the vane side welding plate in position on a grid, and with a sleeve side welding plate also positioned on the grid.

In FIG. 9, there is provided a plan view of an assembly which comprises grid 16, retention strap 80, vane side welding plate 120, and a portion of sleeve side welding plate 150. Vane side welding plate 120 has a plurality of openings 122 therethrough, the openings 122 being in registry with the intersections of the straps 20. The openings 122 provide access for the entry of a laser beam, so as to weld the straps 20 at each point of intersection.

The vane side welding plate is provided with the noted access openings 122 for the laser beam to act upon the grid at the points of intersection of the inner straps. The access openings are made as large as possible, consistent with providing suitable strength to the vane side welding plate 120. There, therefore, remains a portion of the vane side welding plate 120 which surrounds each of the openings 122, and it is these portions which could be engaged by the vanes 42 as the vane side welding plate 120 is mated with the grid 16. Any of the vanes 42 which would be out of alignment with an opening 122 would be engaged by the vane side welding plate 120 and prevent complete mating. The function of the fixture 100, therefore, is to insure that the vanes 42 are in alignment with the openings 122, by causing them, and their associated segments of inner straps 20a, to be in proper position for entry of vanes 42 into the openings 122.

There has been provided a fixture which is capable of engaging and deflecting vanes, with their attendant segments, of certain of the inner straps forming a fuel rod grid. As above indicated, this engagement aligns the vanes with openings of the vane side welding fixture. Through the utilization of the herein disclosed fixture, the possibility of vane breakage is avoided, since the vanes are aligned with the openings in the vane side welding plate.

In considering this invention, it should be remembered that the present disclosure is illustrative only and the scope of the invention should be determined by the appended claims.

We claim:

1. For use in the welding of a grid comprising sets of spaced, parallel and slotted straps, said straps of one set being substantially perpendicular to the straps of the other set, and the straps of each set entering the slots of the straps of the other set, said straps having vanes on one side of said grid extending at an angle to said straps, the strap of said one set of straps having said slots extending thereinto from the same edge from which the vanes extend;

a strap and vane positioning fixture comprising a plate, and means on said plate for engaging vanes of straps having said slots extending from the same edge as said vanes, and for moving into alignment segments of said straps between said slots which have vanes extending therefrom, with said means on said plate comprising a plurality of substantially parallel rods extending from said plate, and means on each of said rods for engaging at least one vane, with said means on each of said rods comprising a spade mounted at the distal end of each said rod.

2. The apparatus of claim 1, at least some said spades having a pair of oppositely extending blades.

3. The apparatus of claim 2, at least some said spades having a single blade.

4. The apparatus of claim 1, wherein a first group of said rods is at the periphery of said plate, the spades on the rods of said first group each having a single blade, and wherein the rods inwardly of the periphery comprise a second group of rods, the rods of said second group each having a spade with a pair of oppositely extending blades.

5. The apparatus of claim 1, said plate further comprising adjustable abutment means for engaging the grid assembly on the side thereof opposite said vanes.

6. The apparatus of claim 5, and further comprising guidepin means extending from said plate substantially parallel to said rods.

7. The apparatus of claim 6, and means positioning each said rod for entry into a cell of the grid.

8. A strap and vane positioning fixture for positioning segments of straps forming a grid, the segments being between slots extending into said straps from an edge thereof, said segments having vanes extending therefrom, said fixture comprising:
(a) a plate;
(b) a plurality of rods extending from a major planar surface of said plate, said rods being positioned in rows and columns conforming to the cells of said grid; and
(c) each of said rods having thereon means comprising a spade for engaging at least one vane of the grid to thereby align the strap elements.

9. The fixture of claim 8, and further comprising adjustable abutment means extending from said major planar surface of said plate.

10. The fixture of claim 8 or 9, wherein the rods at the periphery of said plate each has a single blade and wherein the remainder of the rods each has a pair of oppositely extending blades.

* * * * *